US012655936B2

(12) United States Patent
Nelson et al.

(10) Patent No.: US 12,655,936 B2
(45) Date of Patent: Jun. 16, 2026

(54) ALTERNATE LUBRICATION MECHANISMS FOR VEHICLE BEARINGS OIL BAFFLES AND TRAPS

(71) Applicant: RTX Corporation, Farmington, CT (US)

(72) Inventors: Alexander Robert Nelson, Amston, CT (US); Brady L. Walker, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/433,564

(22) Filed: Feb. 6, 2024

(65) Prior Publication Data

US 2025/0251083 A1 Aug. 7, 2025

(51) Int. Cl.
*F16N 37/00* (2006.01)
*F02C 7/06* (2006.01)
*F16N 39/02* (2006.01)

(52) U.S. Cl.
CPC .............. *F16N 37/003* (2013.01); *F02C 7/06* (2013.01); *F16N 39/02* (2013.01); *F05D 2260/98* (2013.01); *F16N 2200/10* (2013.01); *F16N 2200/12* (2013.01); *F16N 2210/02* (2013.01); *F16N 2270/20* (2013.01)

(58) Field of Classification Search
CPC ........ F16N 39/02; F16N 9/02; F16N 2200/10; F16N 2200/12; F16N 2200/02; F16N 2270/20; F16C 35/042; F02C 7/06; F05D 2260/98
See application file for complete search history.

(56) References Cited

U.S. PATENT DOCUMENTS

| | | | | |
|---|---|---|---|---|
| 3,621,937 A | * | 11/1971 | Edge | ....................... F01D 25/18 60/39.08 |
| 5,465,810 A | * | 11/1995 | Peterson | ................. F16N 39/00 184/6.21 |
| 5,485,895 A | * | 1/1996 | Peterson | .............. C10M 177/00 184/104.1 |
| 11,066,968 B1 | * | 7/2021 | Nickols | ................ F02M 35/167 |
| 11,125,274 B1 | * | 9/2021 | Sladen | ................ F16C 33/6681 |

(Continued)

FOREIGN PATENT DOCUMENTS

WO        2014070691 B1        8/2002

OTHER PUBLICATIONS

Extended European Search Report for counterpart EP Application No. 25155047 dated Apr. 14, 2025.

*Primary Examiner* — Victoria P Augustine
*Assistant Examiner* — Mark K Buse
(74) *Attorney, Agent, or Firm* — Bachman & LaPointe, P.C.

(57) ABSTRACT

A lubrication system including a bearing compartment housing defining a bearing compartment housing interior having a bearing compartment housing interior surface and a bearing compartment housing exterior having a bearing compartment housing exterior surface; a shaft supported by bearings located within the bearing compartment housing; and a lubricant trap formed on the bearing compartment housing interior surface, the lubricant trap configured to contain at least one lubricant, the at least one lubricant configured to be released onto the bearing.

6 Claims, 4 Drawing Sheets

(56)     References Cited

U.S. PATENT DOCUMENTS

| 11,732,647 | B2 * | 8/2023 | Sladen | F16C 33/6681 |
| | | | | 184/6.22 |
| 12,104,580 | B2 * | 10/2024 | Nielsen | F16C 33/6666 |
| 2005/0132710 | A1 | 6/2005 | Peters et al. | |
| 2006/0081419 | A1 * | 4/2006 | Care | F16N 7/40 |
| | | | | 184/6.11 |
| 2019/0186691 | A1 * | 6/2019 | LaBerge | F16N 25/00 |
| 2020/0173496 | A1 * | 6/2020 | Wild | F04D 29/5893 |
| 2021/0215165 | A1 * | 7/2021 | Grant | F04D 29/582 |
| 2023/0012715 | A1 * | 1/2023 | Nielsen | F16C 33/6685 |
| 2023/0046366 | A1 * | 2/2023 | Nielsen | F16N 31/00 |

* cited by examiner

ALTERNATE LUBRICATION MECHANISMS FOR VEHICLE BEARINGS OIL BAFFLES AND TRAPS

BACKGROUND

The present disclosure is directed to a lubrication system for bearings utilizing inner surfaces of a bearing compartment to trap lubricant.

Some aircraft engines use fluid lubricated bearings. The lubricated bearings traditionally use lubrication systems which utilize pressurized oil and/or fuel that require parts such as supply/scavenge pumps, reservoirs, sumps, plumbing/pipes, and seals. These lubrication system components can account for up to 30% of overall propulsion system weight, volume, and cost in certain engines (e.g., small limited-life engines).

SUMMARY

In accordance with the present disclosure, there is provided a lubrication system comprising a bearing compartment housing defining a bearing compartment housing interior having a bearing compartment housing interior surface and a bearing compartment housing exterior having a bearing compartment housing exterior surface; a shaft supported by bearings located within the bearing compartment housing; and a lubricant trap formed on the bearing compartment housing interior surface, the lubricant trap configured to contain at least one lubricant, the at least one lubricant configured to be released onto the bearing.

A further embodiment of any of the foregoing embodiments may additionally and/or alternatively include the lubricant trap includes surface features formed on the bearing compartment housing interior surface.

A further embodiment of any of the foregoing embodiments may additionally and/or alternatively include the surface features are selected from the group comprising a baffle, a gusset, a groove, a channel, a furrow, a ledge, a flange, a wall, a rib, and the like.

A further embodiment of any of the foregoing embodiments may additionally and/or alternatively include the lubrication trap is integral with the bearing compartment housing interior surface.

A further embodiment of any of the foregoing embodiments may additionally and/or alternatively include the lubricant comprises at least one of a paste, and a high viscosity material at standard room temperature conditions, wherein the lubricant is configured to change viscosity responsive to a change in temperature.

A further embodiment of any of the foregoing embodiments may additionally and/or alternatively include a variety of lubricants are employed along an axial length of the bearing compartment interior surface relative to the bearing.

A further embodiment of any of the foregoing embodiments may additionally and/or alternatively include the lubrication system further comprising fins in operative communication with the bearing compartment housing proximate the exterior surface.

In accordance with the present disclosure, there is provided a lubrication system comprising a gas turbine engine having a gas turbine engine housing, the gas turbine engine housing having a forward portion opposite an aft portion; a shaft mounted within the gas turbine engine housing, the shaft having an axis; a bearing compartment housing defining a bearing compartment housing interior having a bearing compartment housing interior surface and a bearing compartment housing exterior having a bearing compartment housing exterior surface; the shaft supported by bearings located within the bearing compartment housing; and a lubricant trap formed on the bearing compartment housing interior surface, the lubricant trap configured to contain at least one lubricant, the at least one lubricant configured to be released onto the bearings.

A further embodiment of any of the foregoing embodiments may additionally and/or alternatively include the lubricant trap includes surface features formed on the bearing compartment housing interior surface, the surface features are selected from the group comprising a baffle, a gusset, a groove, a channel, a furrow, a ledge, a flange, a wall, a rib, and the like.

A further embodiment of any of the foregoing embodiments may additionally and/or alternatively include the lubricant comprises at least one of a paste, and a high viscosity material at standard room temperature conditions, wherein the lubricant is configured to change viscosity responsive to a change in temperature.

A further embodiment of any of the foregoing embodiments may additionally and/or alternatively include the lubrication trap is integral with the bearing compartment housing interior surface.

A further embodiment of any of the foregoing embodiments may additionally and/or alternatively include the lubrication system further comprising fins in operative communication with the bearing compartment housing proximate the exterior surface.

A further embodiment of any of the foregoing embodiments may additionally and/or alternatively include a variety of lubricants are employed along an axial length of the bearing compartment interior surface relative to the bearing.

In accordance with the present disclosure, there is provided a process for delivering a lubricant in a lubrication system comprising mounting a shaft within a gas turbine engine housing of a gas turbine engine having a forward portion opposite an aft portion, the shaft having an axis extending from the forward portion to the aft portion; forming a bearing compartment housing within the gas turbine engine housing, the bearing compartment housing comprising an interior surface and an exterior surface, and the bearing compartment housing being configured to house at least one bearing configured to support the shaft; forming a lubricant trap on the interior surface of the bearing compartment housing; configuring the lubricant trap to contain at least one lubricant; and configuring the at least one lubricant to be released onto the at least one bearing.

A further embodiment of any of the foregoing embodiments may additionally and/or alternatively include the process further comprising forming lubricant trap surface features on the interior surface of the bearing compartment housing, wherein the surface features are selected from the group comprising a baffle, a gusset, a groove, a channel, a furrow, a ledge, a flange, a wall, a rib, and the like.

A further embodiment of any of the foregoing embodiments may additionally and/or alternatively include the process further comprising selecting the lubricant comprising at least one of a paste, and a high viscosity material at standard room temperature conditions, wherein the lubricant is configured to change viscosity responsive to a change in lubricant trap temperature.

A further embodiment of any of the foregoing embodiments may additionally and/or alternatively include the process further comprising forming fins in operative communication with the bearing compartment housing proximate the exterior surface; and configuring the fins to transfer thermal energy from a cavity proximate the exterior surface to the lubricant trap; and configuring the fins to transfer thermal energy from the lubricant trap to a cavity proximate the exterior surface.

A further embodiment of any of the foregoing embodiments may additionally and/or alternatively include the process further comprising employing a variety of lubricants along an axial length of the bearing compartment interior surface relative to the bearing.

A further embodiment of any of the foregoing embodiments may additionally and/or alternatively include the process further comprising locating a first lubricant within a first lubricant trap at a first axial distance from the at least one bearing wherein the first lubricant is configured to release from the first lubricant trap responsive to a first temperature; locating a second lubricant within a second lubricant trap at a second axial distance from the at least one bearing, wherein the second lubricant is configured to release from the second lubricant trap responsive to a second temperature; lubricating the at least one bearing with the first lubricant at the first temperature; and lubricating the at least one bearing with the second lubricant at the second temperature.

A further embodiment of any of the foregoing embodiments may additionally and/or alternatively include the process further comprising configuring the fins to transfer the thermal energy by conduction from the bearing compartment housing and subsequently away from the lubricant trap; cooling the bearing compartment housing to condense lubricant mist suspended in the air within the interior; condensing the mist onto the interior surface; and trapping the lubricant within the lubrication trap.

Other details of the lubrication system are set forth in the following detailed description and the accompanying drawings wherein like reference numerals depict like elements.

DETAILED DESCRIPTION

Figure 1:
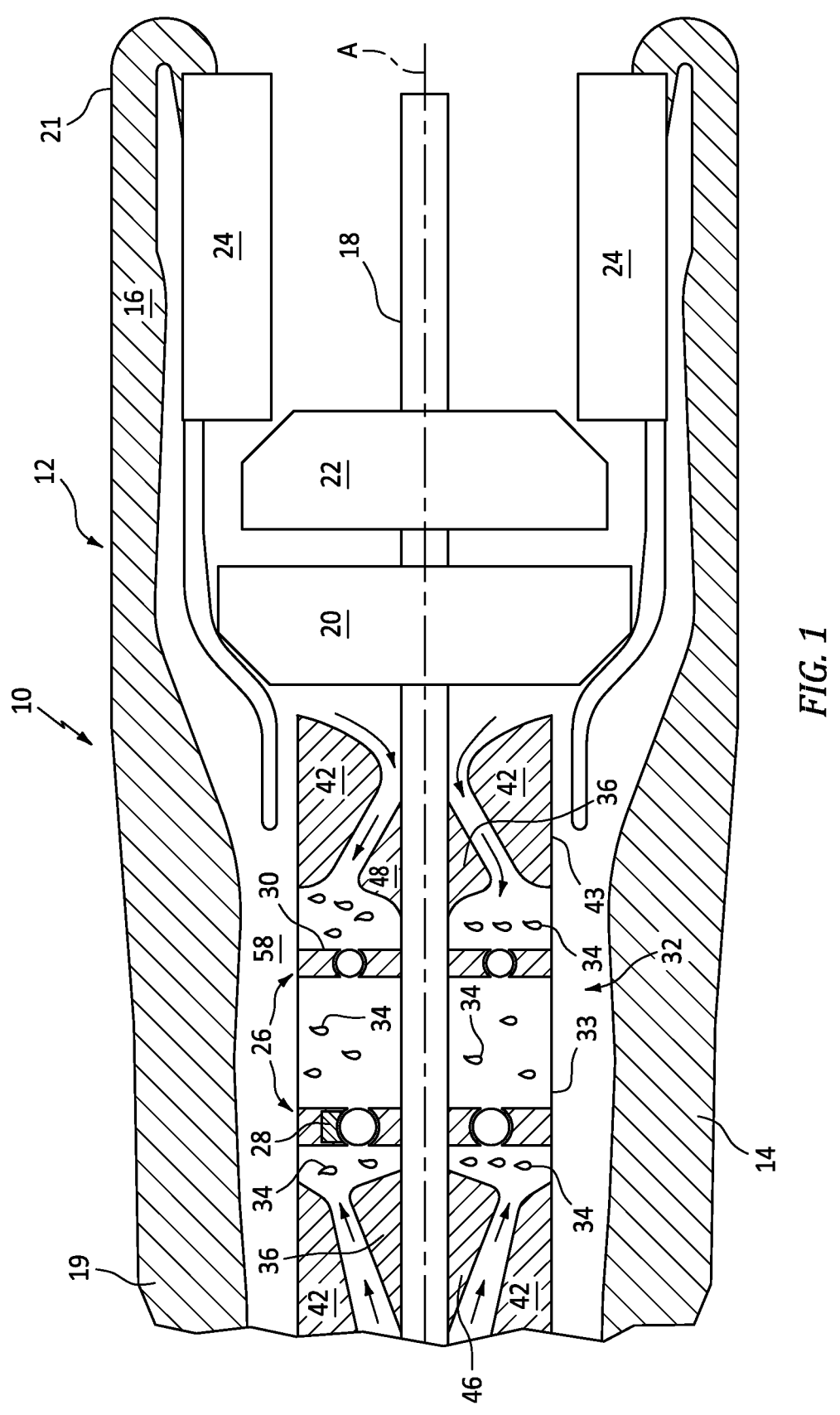
FIG. 1 is a schematic representation of an exemplary lubrication system associated with a gas turbine system in a vehicle.
Figure 2:
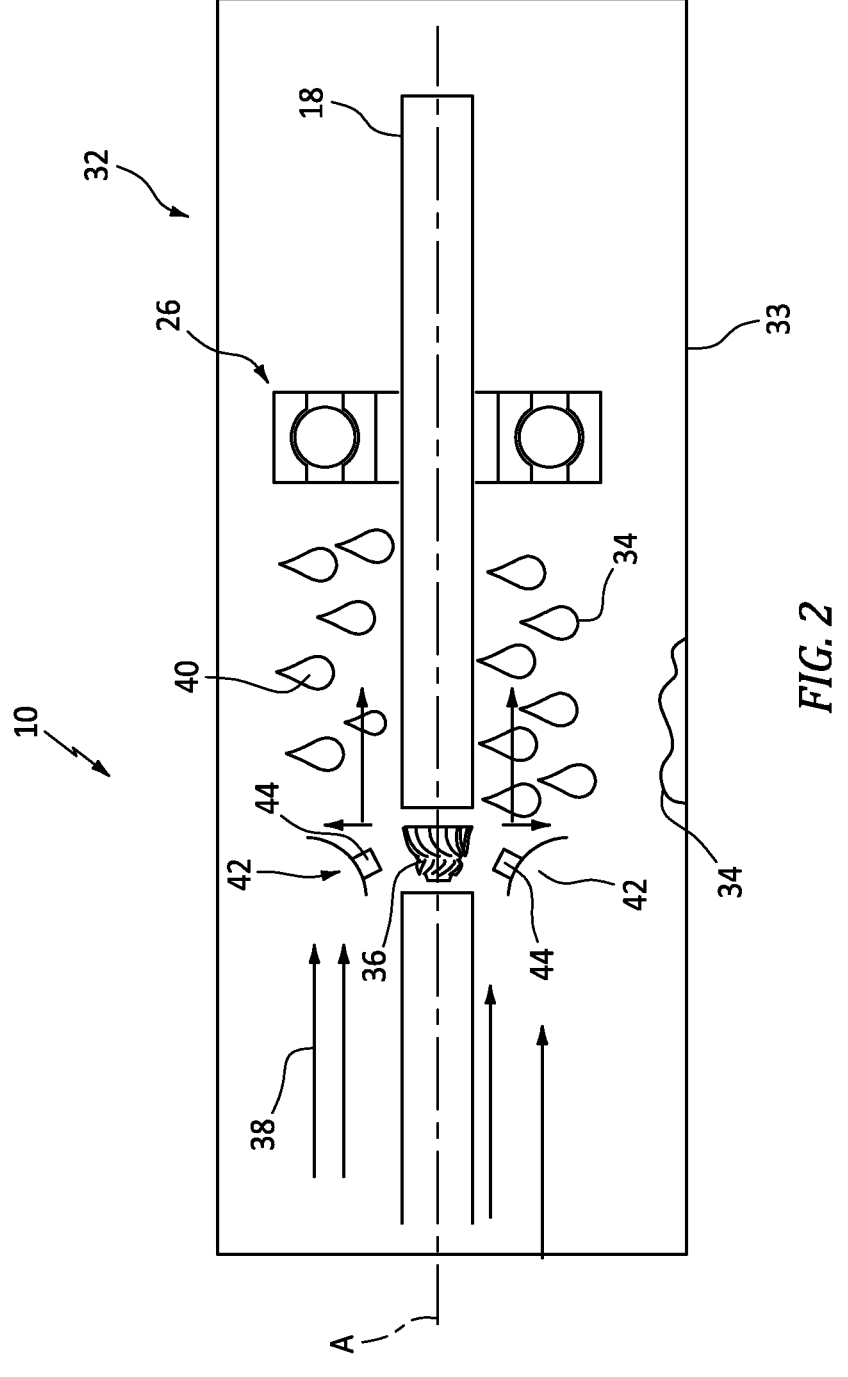
FIG. 2 is a schematic representation of the exemplary lubrication system.

Referring now to FIG. 1 and FIG. 2, there is illustrated an exemplary lubrication system 10. The lubrication system 10 is associated with a gas turbine engine (turbo-jet) 12 installed in a vehicle 14, such as an unmanned or expendable vehicle. The gas turbine engine 12 includes a housing 16 supporting a shaft 18 aligned along an axis A. A forward portion 19 of the gas turbine engine 12 and an aft portion 21 of the gas turbine engine 12 are shown relative to the axis A. The gas turbine includes a compressor 20, a turbine 22 and combustor(s) 24. The compressor 20 and turbine 22 can be supported on the shaft 18.

The shaft 18 can be supported on bearings 26, such as first bearing 28 and second bearing 30. The first bearing 28 can be located axially forward of the second bearing 28 along the shaft 18. The bearings 26 can be located within a bearing compartment 32. The bearing compartment 32 includes a bearing compartment housing 33 that contains the bearings 26. The bearing compartment 32 can contain lubricant 34. The lubricant 34 can include liquid lubricant and lubricant mist, lubricant suspended in air as well as solid lubricant and semi-solid lubricant. The lubricant 34 can be an oil, a fuel, a grease and the like. The lubricant 34 can have a variety of viscosities. The lubricant 34 can be temperature dependent and change viscosity responsive to the temperature.

The lubrication system 10 can include a persuader 36. The persuader 36 can be in operative communication (e.g., coupled to, formed with, and the like) with the shaft 18. The persuader 36 can be configured to be rotated by the shaft 18. The persuader 36 can be integral with the shaft 18. The persuader 36 can be mounted to the shaft 18. The persuader 36 can include a fan, an axial flow fan, a compressor, a mixed flow compressor, and the like.

The persuader 36 can be configured to propel the lubricant 34 in any phase or form, such as a liquid, a gas, a mixed phase fluid, and the like. The persuader 36 can be positioned to propel air 38 containing the lubricant 34. The lubricant 34 can be provided from a variety of sources and locations, such as, in the form of an oil mist, or grease dripping from a surface or such as a drip or mist from an oil tank. The persuader 36 can propel air 38, lubricant 34 and/or a mist 40 of lubricant 34/air 38. The persuader 36 can propel the lubricant 34 into contact with the bearings 26 to provide lubrication to the bearings 26. The persuader 36 can propel the lubricant 34 through the bearing compartment 32 from sources within the bearing compartment 32. The persuader 36 can propel the lubricant 34 from a source outside the bearing compartment 32 into the bearing compartment 32 and onto into contact with the bearings 26. The persuader 36 can be configured to maintain the lubricant 34/mist 40 to stay within the bearing compartment 32.

A volute 42 can encase the persuader 36. The volute 42 can be configured to direct the air 38 in proximity of the persuader 36 to propel the air 38/mist 40 onto the bearings 26. In an exemplary embodiment, the volute 42 can be an integral mixed flow compressor volute, formed as part of the bearing compartment housing 33. The volute 42 can be cast or machined into the bearing compartment housing 33. The volute 42 can be bolted/attached to the bearing compartment housing 33. In an exemplary embodiment, the bearing compartment housing 33 can be configured as a clam-shell design. The bearing compartment housing 33 can be removed with the volute 42. The volute 42 formed as a clam-shell design can be built around the persuader 36 (mixed flow compressor). The volute 42 can be built, and/or part of the housing 33 of the engine 12. In an exemplary embodiment, the volute 42 can be built by additive manufacturing (3D print) to better serve reducing part count.

As illustrated in FIG. 2, guide vanes 44 can be incorporated with the persuader 36 to influence the flow of the air 38/mist 40 lubricant 34 through the persuader 36. The guide vanes 44 can be formed integral with the volute 42. The guide vanes 44 can be configured to alter the fluid flow of the air 38/mist 40 lubricant 34 through the bearing compartment 32.

The exemplary embodiment shown in FIG. 1 incorporates a first persuader 46 and a second persuader 48. The first persuader 46 is configured to propel the air 38/mist 40, lubricant 34 into the first bearing 28 in an aft direction. The second persuader 48 is configured to propel the air 38/mist 40, lubricant 34 into the second bearing 30 in a forward direction. The first persuader 46 and second persuader 48 maintain a lubricant 34 in contact with the bearings 26.

Figure 3:
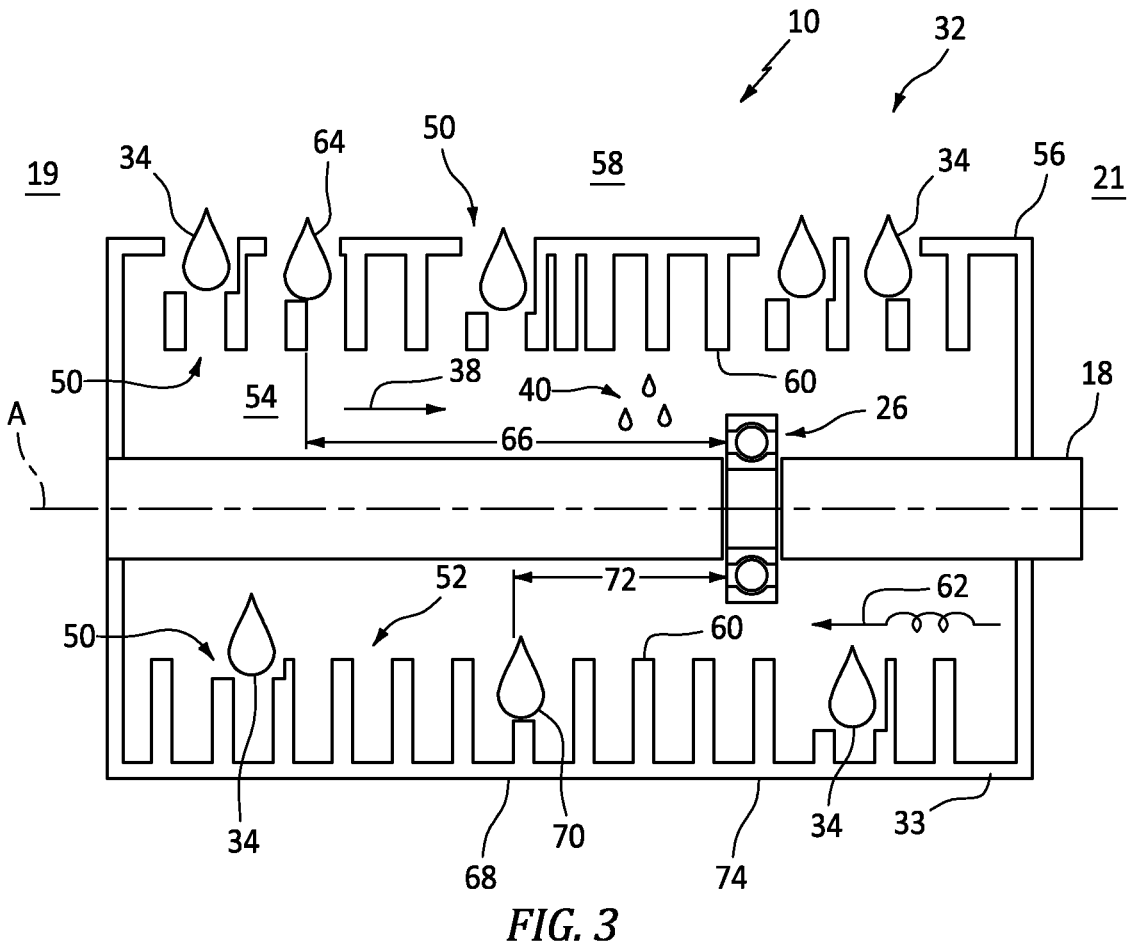
FIG. 3 is a schematic representation of an exemplary lubrication system with lubricant traps.
Figure 4:
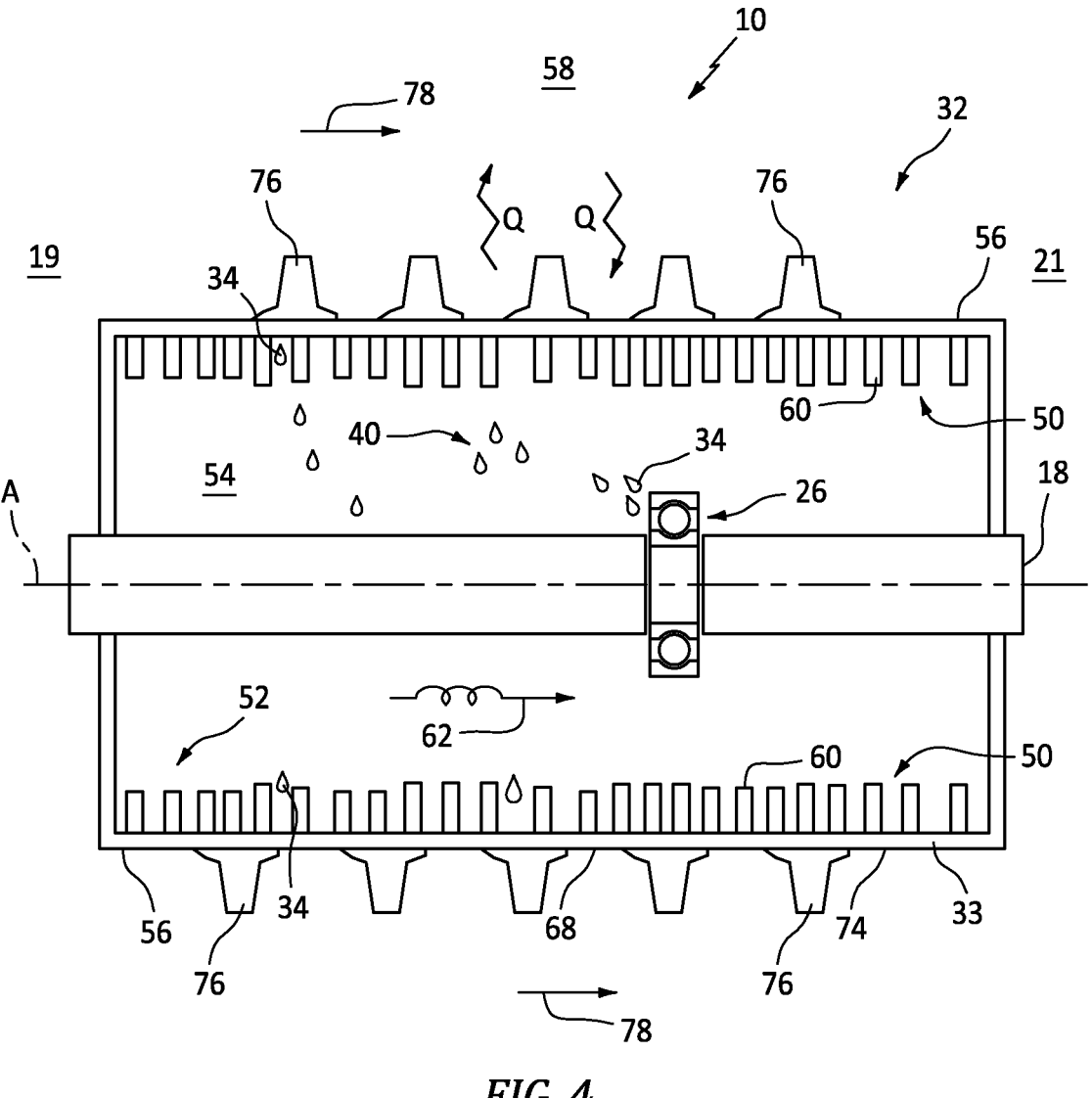
FIG. 4 is a schematic representation of another exemplary lubrication system with lubricant traps.

Referring also to FIG. 3 and FIG. 4, an exemplary lubrication system 10 with lubricant trap 50 is shown. The lubricant trap 50 can be formed in the bearing compartment housing 33. The bearing compartment housing 33 can include an interior surface 52 defining a bearing compartment housing interior 54. The bearing compartment housing 33 can include an exterior surface 56. The exterior surface 56 of the bearing compartment housing 33 can be exposed to the cavity 58 within the gas turbine engine housing 16.

The bearing compartment housing interior surface 52 can include surface features 60. The surface features 60 can be shaped as a baffle, a gusset, a groove, a channel, a furrow, a ledge, a flange, a wall, a rib, and the like. The surface features 60 can be formed into patterns, such as a grid pattern, a honeycomb pattern and the like. The surface feature 60 can be configured to capture, store and then release the lubricant 34 responsive to predetermined conditions within the bearing compartment housing 33.

The lubricant 34 can be a paste or high viscosity material at standard room temperature conditions. The lubricant 34 can be configured to change viscosity responsive to changes in temperature, such as the operational temperatures of the gas turbine engine 16 proximate the bearing compartment 32. The lubricant 34 can change from a paste/solid phase/semi-solid phase to a liquid phase, a vapor, or a mixed phase responsive to a change in the temperature of the bearing compartment housing 33, such as the surface features 60 being heated.

For example, the lubricant 34 can be attached to the surface feature 60 within the lubricant trap 50 at a nominal room temperature T1 during a manufacturing step. For example, the lubricant trap 50 can be dipped into a liquid lubricant bath (not shown). The liquid lubricant 34 can be cooled to a room temperature, become a solid or semi-solid and lodge within the surface features 60 of the lubricant trap 50. The lubricant 34 can remain lodged within the lubricant trap 50 indefinitely during predetermined storage conditions. The gas turbine engine 12 can be assembled and kept in storage. Subsequently, after the gas turbine engine 16 has become operational, the bearing compartment 32 can become heated and an operational temperature T2 can be achieved. The lubricant 34 upon being exposed to the operational temperature T2 can become viscous and move out of the lubricant trap 50. The lubricant 34 can become suspended in the air 38. The lubricant 34 can become entrained in an airstream 62 within the interior 54, created by shaft 18 windage. The lubricant 34 can become mist 40 within the bearing compartment 32. The lubricant 34 can be entrained in the air 38 and propelled onto the bearing 26 as described above. The lubricant 34 can wick and/or drip onto the bearing 26.

In an exemplary embodiment, a variety of lubricants 34 can be employed along the axial length of the bearing compartment interior surface 52 relative to the bearing 26. A first lubricant 64 can be employed and lodged within the lubricant trap 50 at a first axial distance 66 from the bearing 26. The first lubricant 64 can become viscous and flow at a first temperature 68. A second lubricant 70 can be employed and lodged into the lubricant trap 50 at a second axial distance 72 from the bearing 26. The second lubricant 70 can become viscous and flow at a second temperature 74. The second temperature 74 may be different from or the same as the first temperature 68.

During operation of the gas turbine engine 12, the interior surface 52 of the bearing compartment housing 33 can be heated to the first temperature 68. The first lubricant 64 can become more viscous and flow out of the lubricant trap 50 into the bearing compartment housing interior 54. The first lubricant 64 can become available to lubricate the bearing 26 at the first temperature 68.

Subsequently, during operation of the gas turbine engine 12, the interior surface 52 of the bearing compartment housing 33 can be heated to the second temperature 74. The second lubricant 70 can become more viscous and flow out of the lubricant trap 50 into the bearing compartment housing interior 54. The second lubricant 70 can become available to lubricate the bearing 26 at the second temperature 74. It is contemplated that a variety of lubricants 34 can be employed at various locations and become available for use in the bearing 26 responsive to gas turbine engine 12 operational conditions and temperature variation. The various lubricants 34 can be strategically placed to provide lubrication to the bearing 26 over time or under certain conditions without the need for a lubrication pump or plumbing system to deliver the lubricant to the bearing 26.

As seen in FIG. 4, the exemplary lubrication system 10 can include heat transfer fins 76 attached to the bearing compartment housing 33 proximate the exterior surface 56. The fins 76 are configured to transfer thermal energy Q to/from the bearing compartment housing 33.

In an exemplary embodiment, the cavity 58 can have a temperature T that is hot relative to the fins 76 (e.g., hotter than) and the bearing compartment housing 33. The thermal energy Q can be transferred from the airstream 78 within the cavity 58 to the fins 76. The fins 76 can transfer the thermal energy by conduction into the bearing compartment housing 33 and subsequently to the lubricant trap 50 to heat the lubricant 34. The lubricant 34 can flow, can be evaporated and entrained within the air 38 of the interior 54. The lubricant 34 can flow as a liquid toward the bearing 26.

In an exemplary embodiment, the cavity 58 can have a temperature T that is cold relative to the fins 76 (e.g., cooler than) and the bearing compartment housing 33. The thermal energy Q can be transferred to the airstream 78 within the cavity 58 from the fins 76. The fins 76 can transfer the thermal energy by conduction from the bearing compartment housing 33 and subsequently away from the lubricant trap 50 to cool the lubricant 34. The cooling of the bearing compartment housing 33 can also create condensate from warmed lubricant 34 suspended in the air 38 within interior 54. The cooled mist 40 can be condensed onto the interior surface 52 and become trapped within the lubrication trap 50.

The condensed lubricant 34 can be re-heated at another time for use to lubricate the bearing 26. The fins 76 can be employed to transport the lubricant 34 within the bearing compartment housing interior 54 to help lubricate the bearing 26.

The fins 76 can be formed integral with the bearing compartment housing 33. The fins 76 can be attached to the exterior surface 56 as separate components. The fins 76 can be configured with low aerodynamic drag properties. The fins 76 can be configured as static vanes which influence the airstream 78 and improve laminar flow and reduce flow vortices. The fins 76 can have an airfoil shape to influence the airstream 78.

A technical advantage of the disclosed lubrication system includes the elimination of a complex lubrication system.

Another technical advantage of the disclosed lubrication system includes weight reduction.

Another technical advantage of the disclosed lubrication system includes cost reduction.

Another technical advantage of the disclosed lubrication system includes improved efficiency of current engine systems.

Another technical advantage of the disclosed lubrication system includes fewer assembly pieces, simpler assembly.

Another technical advantage of the disclosed lubrication system includes elimination of on-board plumbing for oil delivery and return.

Another technical advantage of the disclosed lubrication system includes reduction of joining hardware for legacy lubrication systems, (less nuts and bolts for hardware attachment).

There has been provided a lubrication system. While the lubrication system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for delivering a lubricant in a lubrication system comprising:

mounting a shaft within a gas turbine engine housing of a gas turbine engine having a forward portion opposite an aft portion, the shaft having an axis extending from the forward portion to the aft portion;

forming a bearing compartment housing within the gas turbine engine housing, the bearing compartment housing comprising an interior surface and an exterior surface, and the bearing compartment housing being configured to house at least one bearing configured to support the shaft;

forming a lubricant trap on the interior surface of the bearing compartment housing;

configuring the lubricant trap to contain at least one lubricant comprising a solid or semi-solid material;

locating a first lubricant within a first lubricant trap at a first axial distance from the at least one bearing wherein the first lubricant is configured to release from the first lubricant trap responsive to a first temperature;

locating a second lubricant within a second lubricant trap at a second axial distance from the at least one bearing, wherein the second lubricant is configured to release from the second lubricant trap responsive to a second temperature;

lubricating the at least one bearing with the first lubricant at the first temperature; and lubricating the at least one bearing with the second lubricant at the second temperature.

2. The process of claim 1, further comprising:

forming lubricant trap surface features on the interior surface of the bearing compartment housing, wherein the surface features are selected from the group comprising a baffle, a gusset, a groove, a channel, a furrow, a ledge, a flange, a wall, and a rib.

3. The process of claim 1, further comprising:

selecting the lubricant comprising a paste material at standard room temperature conditions, wherein the lubricant is configured to change viscosity responsive to a change in lubricant trap temperature.

4. The process of claim 1, further comprising:

forming fins in operative communication with the bearing compartment housing proximate the exterior surface; and configuring the fins to transfer thermal energy from a cavity proximate the exterior surface to the lubricant trap; and configuring the fins to transfer thermal energy from the lubricant trap to a cavity proximate the exterior surface.

5. The process of claim 1, further comprising:

employing a variety of lubricants along an axial length of the bearing compartment interior surface relative to the bearing.

6. The process of claim 1, further comprising:

configuring the fins to transfer the thermal energy by conduction from the bearing compartment housing and subsequently away from the lubricant trap;

cooling the bearing compartment housing to condense lubricant mist suspended in the air within the interior;

condensing the mist onto the interior surface; and trapping the lubricant within the lubrication trap.

* * * * *